(12) United States Patent
Ziauddin et al.

(10) Patent No.: US 9,659,039 B2
(45) Date of Patent: May 23, 2017

(54) MAINTAINING STALENESS INFORMATION FOR AGGREGATE DATA

(71) Applicant: Oracle International Corporation, Redwood Shores, CA (US)

(72) Inventors: Mohamed Ziauddin, Redwood Shores, CA (US); Andrew S.C. Witkowski, Redwood Shores, CA (US); You Jung Kim, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 112 days.

(21) Appl. No.: 14/033,380

(22) Filed: Sep. 20, 2013

(65) Prior Publication Data

US 2015/0088812 A1 Mar. 26, 2015

(51) Int. Cl.
*G06F 17/30* (2006.01)

(52) U.S. Cl.
CPC .............. *G06F 17/30289* (2013.01)

(58) Field of Classification Search
None
See application file for complete search history.

(56) References Cited

U.S. PATENT DOCUMENTS

| | | | |
|---|---|---|---|
| 6,334,128 B1 | 12/2001 | Norcott et al. | |
| 6,408,310 B1* | 6/2002 | Hart | G06F 11/1662 |
| 2006/0122964 A1* | 6/2006 | Yu et al. | 707/2 |
| 2006/0212436 A1* | 9/2006 | Gupta et al. | 707/3 |
| 2008/0120275 A1* | 5/2008 | Cruanes et al. | 707/2 |
| 2008/0201296 A1* | 8/2008 | Yu | G06F 17/30486 |
| 2008/0275840 A1* | 11/2008 | Burger et al. | 707/2 |
| 2012/0054248 A1* | 3/2012 | Mehrotra et al. | 707/803 |
| 2012/0303621 A1* | 11/2012 | Newnham et al. | 707/737 |
| 2012/0311241 A1* | 12/2012 | Lee | 711/103 |

OTHER PUBLICATIONS

Dunn et al., "Sequenced subset operators: definition and implementation." Data Engineering, 2002. Proceedings. 18th International Conference on. IEEE, 2002, pp. 81-92.*

\* cited by examiner

*Primary Examiner* — Alex Gofman
*Assistant Examiner* — Umar Mian
(74) *Attorney, Agent, or Firm* — Hickman Palermo Becker Bingham LLP (57) ABSTRACT

Computer systems, machine-implemented methods, and stored instructions are provided herein for maintaining information that describes aggregate characteristics of data within zones. Stored data may be separated into defined zone(s). Data structure(s), such as zone map(s), may store, for each of the zone(s), aggregate characteristic(s) of data in the zone, and a stored indication of whether or not the zone is stale. When a change is made to data in a particular zone that was not stale, a zone manager causes the particular zone to become stale if the change can result in the particular zone having data that is not included in the particular zone's stored aggregate characteristic(s). On the other hand, if the change cannot result in the particular zone having data that is not included in the particular zone's stored aggregate characteristic(s), then the zone manager does not cause the particular zone to become stale.

38 Claims, 5 Drawing Sheets

STORAGE DEVICE(S) 400

ZONE MAP 402

| ID | RANGE(AGE) | LEVEL | STATE |
|---|---|---|---|
| 1 | 18:35 | 1 | 1 |
| 2 | 18:25 | 0 | 0 |
| 3 | 20:29 | 0 | 1 |
| 4 | 25:35 | 0 | 0 |
| 5 | 36:60 | 1 | 0 |
| 6 | 38:44 | 0 | 0 |
| 7 | 36:46 | 0 | 0 |
| 8 | 45:55 | 0 | 0 |
| 9 | 50:60 | 0 | 0 |

FACT TABLE OBJECT 404

OBJECT FOR PARTITION A 406A

- ZONE 2 REGION 412
- ZONE 3 REGION 413
- ZONE 4 REGION 414

- EXTENT 1 421
- EXTENT 2 422
- EXTENT 3 423
- EXTENT 4 424

OBJECT FOR PARTITION B 406B

- ZONE 6 REGION 416 — EXTENT 5 425
- ZONE 7 REGION 417 — EXTENT 6 426
- ZONE 8 REGION 418 — EXTENT 7 427
- ZONE 9 REGION 419 — EXTENT 8 428

Fig. 5

MAINTAINING STALENESS INFORMATION FOR AGGREGATE DATA

FIELD OF THE INVENTION

The present invention relates to maintaining information that describes aggregate characteristics of data within zones.

BACKGROUND

In a database management system (DBMS) or other data storage and retrieval system, data is often stored as one or more database objects. Each database object may contain individual records, items, or sub-objects, and the data within each item may be further organized into one or more fields, elements, or attributes of the record. Each of the sub-objects may also qualify as a separate database object. In relational database systems, database objects often include tables or indexes that contain rows, and the rows are further organized into columns. In object oriented databases, database objects often include object classes that contain member objects that contain data stored as attributes or variables. Other database architectures may use other terminology, an the present disclosure is not limited to any particular type of database object.

Data containers or portions of data containers may be stored on disk in units that may be referred to as disk blocks or pages. Each disk block typically corresponds to a fixed amount of physical space on disk. The disk blocks may be arranged in extents. Each extent is made up of contiguous disk blocks, and the extent may be designated for storing a specific type of information. In one example, each extent is often reserved to store data from a single datafile. In this example, when writing new data to a datafile after the datafile already contains existing data, the new data may continue on disk at the end of the existing data. Reserving extents for data files may reduce or eliminate file fragmentation. In another example, a data storage system addresses storage units using extents rather than single data blocks.

Extents may further be arranged in segments. Each segment is a set of extents that have been allocated to a database object and which may be stored in the same tablespace. A segment may span multiple datafiles. A tablespace is a logical target for storing data, and a single tablespace may store multiple segments of data.

Data may also be partitioned or separated into multiple partitions. The partitions may be defined based on a partition key value, with different partition key values assigned to different partitions. For example, data corresponding to a "West" division may be assigned to the "West" partition, and data corresponding to an "East" division may be assigned to the "East" partition. Accordingly, as data is stored to a database object that has been partitioned into the "East" and "West" partitions, commands that retrieve or store data corresponding to the "East" division operate on the "East" partition, and commands that retrieve or store data corresponding to the "West" division operate on the "West" partition. Each partition may be stored in a separate segment or collection of segments.

Materialized Views

When a database management system contains very large amounts of data, certain queries against the database can take a long time to execute. The cost of executing a query may be greater when the query (which, for example, may take the form of a "SELECT" statement in the SQL database language) requires joins among a large number of database tables.

Among commercial users of database systems, it has become a common practice to store the results of often-repeated queries in database tables or some other persistent database object. By storing the results of queries, the costly join operations required to generate the results do not have to be performed every time the queries are issued. Rather, the database server responds to the queries by simply retrieving the pre-computed data.

These stored results are commonly referred to as materialized views. The content of a materialized view is defined by metadata referred to as a view definition. The view definition contains mappings to one or more columns in the one or more tables containing the data. Typically, the view definition is in the form of a database query.

Columns and tables that are mapped to a materialized view are referred to herein as base columns and base tables of the materialized view, respectively. The data maintained in the base columns is referred to herein as base data. The data contained in a materialized view is referred to herein as materialized data.

Materialized views eliminate the overhead associated with gathering and deriving the data every time a query is executed. Computer database systems that are used for data warehousing may maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information are referred to herein as "summary tables" or more simply, "summaries".

Summary tables typically store aggregated information, such as "sum of PRODUCT_SALES, by region, by month." Other examples of aggregated information include counts of tally totals, minimum values, maximum values, and average calculations.

Through a process known as query rewrite, a query can be optimized to recognize and use existing materialized views that could answer the query. The data in materialized views needs to be identical to the data in the underlying base tables in order for the materialized to be used in place of their underlying base tables when executing rewritten queries.
Refreshing Materialized Views As new data is periodically added to the base tables of a materialized view, the materialized view needs to be updated to reflect the new base data. A materialized view that does not require updating is considered to be "fresh". Otherwise, the materialized view is considered to be "stale". Materialized views are marked as stale in response to any change to the base data that is represented by the materialized view. Typically metadata stored in a database catalog is used to track the staleness of a dependent object such as a materialized view. The staleness is tracked at the object level which means the entire materialized view becomes stale after a change to the underlying base table is committed.

If a base table is partitioned, then the staleness of a materialized view of the base table may be tracked at the partition level. This type of staleness tracking is called Partition Change Tracking (PCT). Again, the database catalog is used to store PCT-related staleness, which identifies the change committed to a specific base table partition.

Stale materialized views are not safe to use because the data in the view may no longer be equivalent to the base data. A stale materialized view may be recomputed by various techniques that are collectively referred to as "refresh" operations.

Data loading and refresh of materialized views typically takes place during off-hours when the data warehouse is in a controlled period of little activity. The data loading and refresh is restricted to a time period called the refresh window during which the system can be dedicated to refresh. The refresh window is typically allowed to be no more than four to six hours. Refresh may be deferred until the end of the week or month, so that loading of additional detail data may occur much more frequently than refresh.

One approach to refreshing materialized views is referred to as the "total refresh" or "full refresh" approach. According to the total refresh approach, the values in materialized views are recalculated based on all of the base data every time new base data is supplied. Systems that employ full refresh approach have the disadvantage that the recreation process is a relatively lengthy operation due to the size and number of tables from which the materialized data is derived. For example, when ten new rows are added to a particular base table that contains a million rows, a total refresh operation would have to process all one million and ten rows of the base table to regenerate the materialized views derived using the base table.

Materialized views may also be incrementally refreshed, where, rather than generating a new set of materialized data based on calculations that use all of the base data, the materialized data is updated based on just the new base data. Incremental refresh may involve the re-computing of materialized data as data is being loaded into base tables. Thus, as one set of rows is added to a base table, the materialized view is updated based on the data in the new rows. As a second set of rows is added to a base table, the materialized view is again updated based on the data in the second set of rows. The incremental refresh is neither practical nor efficient for two reasons: first, the database user may have business reasons to not re-compute the materialized view each and every time data is loaded into base tables; and second, combining refresh with data loading degrades the performance of the data-loading procedure.

A deferred refresh technique marks materialized views as stale whenever the data in the base tables are changed. A refresh of the stale materialized views may be deferred until the end of the week or month, so that loading of additional data into the base tables of a materialized view may occur much more frequently than refresh of the materialized view.

Refreshing materialized views often requires a significant amount of time and computational power. If not performed efficiently, it is possible for the overhead associated with refreshing materialized views to outweigh any benefits derived from using the materialized views for processing queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Computer systems, machine-implemented methods, and stored instructions are provided herein for maintaining information that describes aggregate characteristics of data within zones. A zone is a set of contiguous storage locations that hold at least part of a logical set of data, such as a database object, record, field, partition, extent, segment, tablespace, or database. Based on a setting that may be set by default or customizable, the zone may have a size that is different from or the same as a size of any of a data block, an extent, or a partition. Stored data may be separated into defined zone(s). Database structure(s), such as zone map(s), may store, for each of the zone(s), a set of aggregate characteristic(s) of data in the zone, and a stored indication of whether or not the zone is stale. When a change is made to data in a particular zone that was not stale, a server causes the particular zone to become stale if the change can result in the particular zone having data that is not included in the particular zone's stored set of aggregate characteristic(s). On the other hand, if the change cannot result in the particular zone having data that is not included in the particular zone's stored set of aggregate characteristic(s), then the server does not cause the particular zone to become stale.

In one embodiment, staleness information for a zone is stored in a dependent object such as a zone map. The staleness information may be tracked to a finer granularity level of a user-defined zone rather than for an entire object or entire partition. The staleness information in non-stale zones, as indicated in the zone map, can be used for pruning purposes even after some zones have become stale. During a scan of a fact table for query evaluation, the server may prune unqualified blocks based on the zones that are still fresh. Pruning the blocks belonging to non-stale zones may save a significant amount of computing resources even if several zones are stale.

Figure 1:
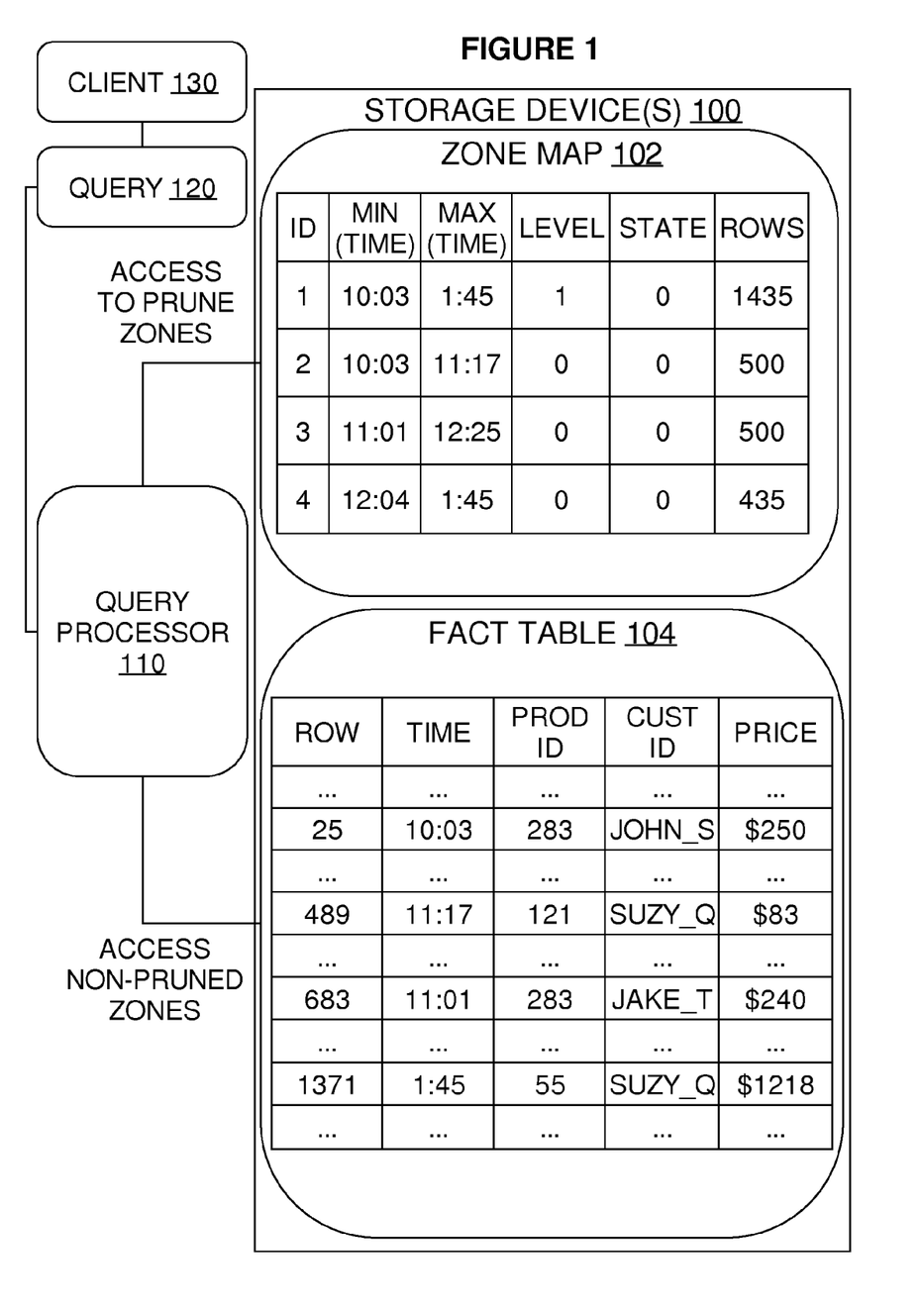
FIG. 1 illustrates an example system for pruning zones before retrieving data from a fact table.

FIG. 1 illustrates an example system for pruning zones before retrieving data from a fact table. As shown, client 130 submits query 120 to query processor 110. In the example, the client may be a user or application, and the query processor may be part of a database server or optimizer. Alternatively, the client may be a database server, and the query processor may be a storage server. Query processor analyzes query 120 and an extent map (not shown) in the data dictionary to determine which zone identifiers are associated with the data requested in the query.

As shown, the zone map 102 and fact table 104 are stored on storage device(s) 100. Zone map 102 describes 4 zones of data, each having a maximum and minimum value for the time column, a level, a staleness or freshness state, and a number of rows in the zone. In the example, zone 1 is a partition at level 1 that includes zones 2-4 at level 0. All zones are fresh, and zones 2 and 3 each have 500 rows of data. Zone 4 has 435 rows of data.

Also as shown, the minimum time value for zone 1 corresponds to row 25 of the fact table, and the maximum time value for zone 1 corresponds to row 1371 of the fact table. The fact table may also include other columns such as PROD ID, CUST ID, and PRICE. Queries that change values in these other columns might not have any effect on the freshness of zone map 102.

In the example, query 120 may request which customers made purchases between 11:10 and 11:20. Query processor 110 may query zone map 102 to determine that zone 1 could include relevant data. Query processor 110 may then determine, based on zone map 102, that zones 2-3 could include relevant data, but zone 4 could not include any relevant data. The minimum time of zone 4 is higher than the maximum time requested in the query, and, thus, zone 4 may be pruned from further evaluation. Query processor may then retrieve rows from zones 2-3 (non-pruned zones) without retrieving rows from zone 4 (pruned zone) to determine whether any of those rows match the query parameters. After retrieving rows, query processor may determine that at least row 489 matches the query parameters.

Figure 2:
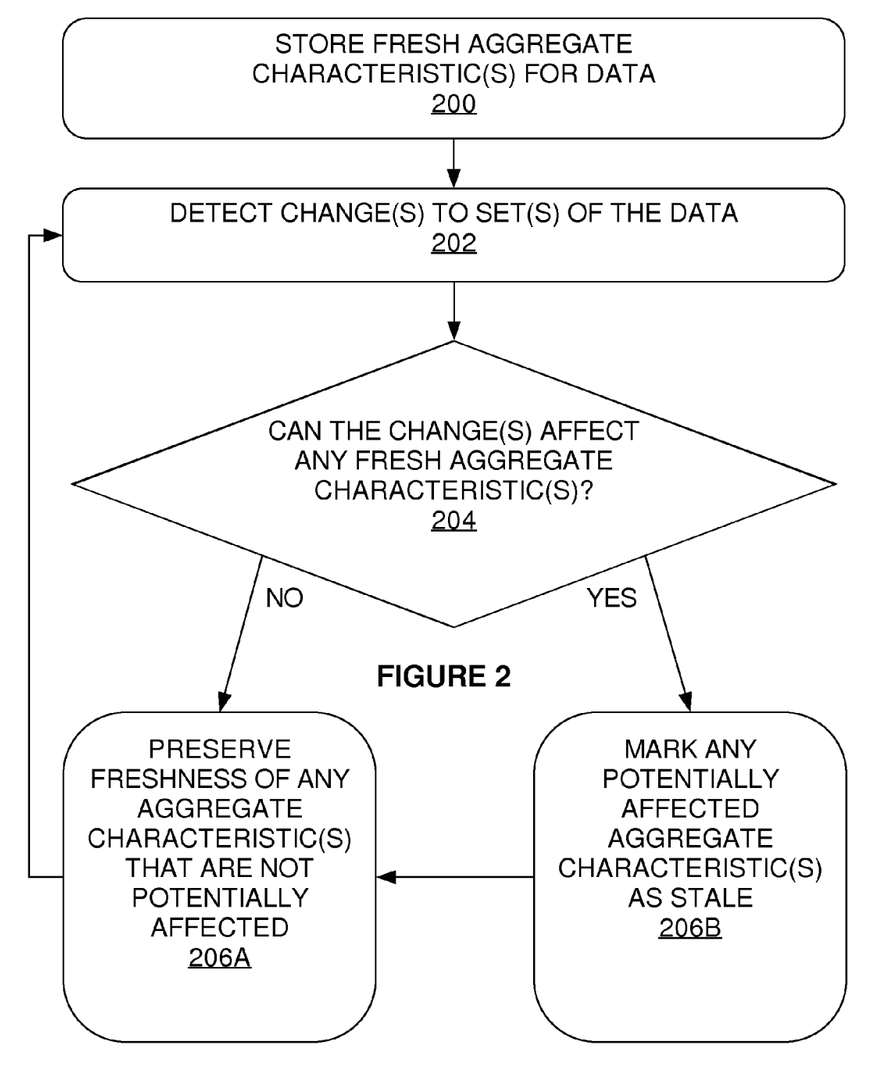
FIG. 2 illustrates an example process for selectively marking zones as stale.

FIG. 2 illustrates an example process for selectively marking zones as stale. In step 200, computing device(s) store fresh aggregate characteristic(s) for data. In step 202, the computing device(s) detect change(s) to set(s) of the data and determine, in step 204, whether the change(s) affect any fresh aggregate characteristic(s). If so, in step 206B, the computing device(s) mark any potentially affected aggregate characteristic(s) as stale. In step 206A, if there are no other change(s) that can affect any fresh aggregate characteristic(s), the computing device(s) preserve freshness of any remaining fresh aggregate characteristic(s).

Setting Up and Identifying Zones

A zone manager includes processes or stored instructions that are specially configured to create or modify zones or information stored about zones. The zone manager may be part of a database server, but may operate independently from a storage server. The zones and zone sizes may be defined independently of any other logical set of data such as a database object, record, field, partition, extent, segment, tablespace, or database. A zone manager may separate a logical set of data into zone(s) of same or similar size. A number of zones may depend on the size of a logical set of data on which the zones are defined. A server may use information maintained for the different zones to make determinations about what data could be in and what data could not be in the different zones. For example, the server could use such information to determine whether or not to access particular zones during evaluation of a query.

In one embodiment, a zone manager sets up and maintains zone sizes by default for logical sets of data. The zone manager may use hard-coded or pre-defined zone sizes, and the server may locate and analyze these zones based on a hard-coded setting without checking to see whether the zone size has changed.

The zone manager may alternatively or additionally use configurable zone sizes that are modifiable by the zone manager or by an application or user. These zone sizes may be modified using a command interface that is exposed to the zone manager, the server, the application, or the user. The command interface may be customized for the zone manager, the server, the application, or the user, or the command interface may conform to a structured query language such as SQL. For example, the zone manager, server, application, or user may submit data definition language commands in SQL to set or modify the zone size and/or to create or modify a zone map, which is a data structure such as a database object that provides information about zone(s).

When setting up zone(s), the zone manager may set up zone sizes and store aggregate information about data in the zone(s) in a zone map. In a particular example shown below, a zonemap, "sales_zmap," is created with a "CREATE MATERIALIZED ZONEMAP" command, and the sizes of the zones defined by the zone map are set to 8 with a "SCALE" sub-command.

---
EXAMPLE COMMAND 1
---
CREATE MATERIALIZED ZONEMAP sales_zmap SCALE 8 AS
SELECT x_zone_id(rowid), MIN(time_id), MAX(time_id),
    MIN(cust_id), MAX(cust_id)
FROM sales
GROUP BY x_zone_id(rowid);
---

In the example, a data definition language (DDL) statement creates a zone map 'sales_zmap' on the 'time_id' and 'cust_id' columns of the fact table 'sales'. The SQL function x_zone_id( ) maps individual rows of the fact table to a specific zone. In other words, rows of the fact table that belong to a set of contiguous blocks on disk may belong to a zone, and all rows of the fact table may belong to one of the zones.

If the size was not set by the SCALE sub-command, then the zonemap may be set to have a default size. The size may indicate a number of contiguous blocks or rows per zone, or the size may merely reflect a scale relative to a default number of blocks or rows per zone. For example, the scale 8 may indicate that each zone should contain 256 ($2^8$) blocks. The zone sizes may be different than the size of any database object, record, field, partition, extent, segment, tablespace, or database. For example, an extent may have 64 ($2^6$) blocks even though the zone has 256 ($2^8$) blocks. Partitions may be variably sized, but an example partition may have 1,048,576 ($2^{20}$) blocks.

In addition to setting zone sizes, the example command also stores, in the zone map, aggregate information about data in the zones, such as the MIN and MAX values in the time_id column and the MIN and MAX values in the cust_id column. This aggregate information may be maintained in the zone map and used by a server to determine which zones can be safely pruned during query evaluation.

A describe in SQLPLUS on the example zone map, sales_zmap, may show the following zone map columns:

---
SQL> DESCRIBE sales_zmap
Name Null? Type
ZONE_ID$ NUMBER
MIN(TIME_ID) DATE
MAX(TIME_ID) DATE
MIN(CUST_ID) NUMBER
MAX(CUST_ID) NUMBER
ZONE_LEVEL$ NUMBER
ZONE_STATE$ NUMBER
ZONE_ROWS$ NUMBER
---

The first column listed by DESCRIBE is ZONE_ID$, which represents the zone identifier. The next four columns correspond to the MIN and MAX aggregates specified in the zone map definition. Columns ZONE_LEVEL$, ZONE_STATE$, and ZONE_ROWS$ may be automatically added to the zone map table by default, and they are used to store zone metadata within the zone map object. ZONE_LEVEL$ may indicates whether ZONE_ID$ identifies a sub-zone or a super-zone, or a zone at a particular level of a hierarchy.

In a specific example, the zone level may identify whether the information is maintained for a zone or a partition. The partition-level information may be relevant if 'sales' table is partitioned, in which case, MIN and MAX aggregates are maintained per zone as well as per partition. Per partition MIN and MAX aggregates are computed by rolling up the per zone MIN and MAX aggregates. In other words, a MIN of a partition is the MIN of all MINs of all zones that are in the partition. Similarly, the MAX of a partition is the MAX of all MAXs of all zones that are in the partition. A partition becomes stale when any of its zones are stale and remains fresh if all of its zones are fresh.

The column ZONE_STATE$ identifies if the aggregate values (MIN and MAX in the example) are fresh or stale. The zone state column may be changed to indicate that the zone has become stale or to indicate that the zone is fresh or has been refreshed.

Column ZONE_ROWS$ stores the count of rows belonging to a zone (or a partition). If the zone is defined on joined tables, the zone map may also include a column that specifies how many anti-joined rows are in the joined tables. Alternatively, the zone map may have a flag that indicates whether or not there are any anti-joined rows in the joined tables.

A zone may be identified using at least one of the storage locations represented by the zone or any other mechanism that allows the zone to be mapped to the storage location(s) represented by the zone. A zone identifier may be derived from the location(s) or managed separately from the location(s). In one example, if each zone is a set of blocks and each block has its own address, then a zone may be identified using a portion of the storage address or block address that is generic with respect to all blocks or storage units in the zone and unique among different zones of blocks or storage units. For example, for zones of 1024 ($2^{10}$) blocks, the zone identifier of a given zone may be determined by removing or ignoring a right-hand 10 bits from the block address of any block in the zone, assuming that those 10 bits are used to uniquely identify the blocks within the zone. In another example, for zones of 32 ($2^5$) blocks, the zone identifier may be determined by removing a right-hand 5 bits from the block address, assuming that those 5 bits are used to uniquely identify the blocks within the zone.

In one example, to determine the location of a given datafile associated with a extent, the server accesses an extent map, which is a mapping structure that maps each extent of a set of extents to a corresponding set of blocks or storage locations. The addresses of the blocks that are mapped to the extent may be used to derive the zone identifier or address.

In the examples where the zone identifier is derived from location(s) within the zone, a server may use the size of the zone to determine how much or what portion of the storage address to remove or ignore, and the remainder of the storage address may then be used as the zone address or zone identifier. The zone manager may set up zones and configure the zone size for any logical set of data such as a database object, record, field, partition, extent, segment, tablespace, or database. For example, the zone manager may store, in association with a given database object, record, field, partition, extent, segment, tablespace, or database, a zone size to be used for separating that database object, record, field, partition, extent, segment, tablespace, or database into different zones. Different database objects, records, fields, partitions, extents, segments, tablespaces, or databases may have different zone sizes. In another example, the zone size is built into the database system such that the server is hard-coded to expect certain zone sizes under certain circumstances.

In one embodiment, size information is stored as metadata in a database catalog or otherwise in a manner that is accessible to the server. For example, the zone manager may maintain, in the database catalog, information about sizes of different logical sets of data, and the server may retrieve this size information to identify zones within a given logical set of the data. The database catalog may also store other information about the different logical sets of data, such as definitions of the logical sets of data. In one example, the server accesses the database catalog to determine that a table has zones of a size $2^{10}$ blocks, and that the table has a size of $2^{14}$ blocks. In the example, based on this information in the database catalog, the server may determine that the table is separated into 16 ($2^4$) equally sized zones that are addressable by dropping the right-hand 10 bits (i.e., using the 4 remaining bits) from the block addresses that are shared by or common to the blocks in the table.

In another example, a zone is identified using a separately maintained mapping between storage locations and zones. In this example, the zone manager may use a size setting to set up the zones, but the size does not need to be used by the server to derive a zone's identity when using the zones. The zone to which a given storage location belongs may be determined by mapping the storage location to the zone. Similarly, the storage location or set of storage locations to which a zone belongs may be determined by mapping the zone to the storage location or set of storage locations. The separate mapping may be stored in the database catalog or otherwise in a manner accessible to a server when using the zones for pruning purposes.

Maintaining Aggregate Information for Zones

The zone manager may maintain, in zone map(s), aggregate information about zone(s). The aggregate information may include any information that describes a set of data as a whole. The aggregate information about a zone may be used to make judgments about the zone before or even without accessing data from the zone. Examples of aggregate information that may be maintained for a zone include, but are not necessarily limited to:
 a maximum value of at least a subset of data in the zone;
 a minimum value of at least a subset of data in the zone;
 a range of possible values in at least a subset of data the zone;
 a sum, mean, median, or mode of at least a subset of data in the zone;
 a standard deviation or variance of at least a subset of data in the zone; and/or
 a count of rows, joined rows, anti-joined rows, sizes, or other characteristics of at least a subset of data in the zone.

The aggregate information may be stored in association with a range of error tolerance. The range of error tolerance describes an amount of inaccuracy that is tolerated by the aggregate information. For example, the zone manager may store, in a zone map, an average value for a column, and the zone manager may set a range of error tolerance to 1 for the average value. Initially, the average value may be computed by taking the average of all values in the column. If any further values are added to the column that are within the range of error tolerance, then the stored average value may still be used, without re-computation, to describe the average of all values in the column within the range of error tolerance. For example, the average age of customers in a zone may initially be computed as 25 and stored in a zone map with a range of error tolerance of 2. New customers having ages of 23, 24, 25, 26, or 27 may be added to the zone without re-computing the average, and the stored average in the zone map will remain within 2 of the actual average of values in that column. In other words, adding customers that are within the range cannot cause the average to shift outside of the range; therefore, the range may still be used to represent the average value for that column in that zone.

In a particular example, the zone is created for joined database objects, and the aggregate information includes the number of anti-joined rows or a flag that indicates whether or not there are any anti-joined rows.

The aggregate information may be initially stored in zone map(s) when the zone map(s) are set up by the zone manager. The aggregate information may also be periodically or occasionally re-computed as a foreground or background process, optionally when resource usage is otherwise low, and optionally dependent upon whether the aggregate information is stale. The aggregate information may also be re-computed upon determining that the aggregate information is stale. For example, the aggregate information may be re-computed in response to a change in data that could cause the zone to have data that is no longer included in or safely described by the aggregate information.

Detecting Different Types of Changes

Different changes to data in a zone can have different effects on the aggregate information that describes the zone. For example, the aggregate information may define a range of possible values that could be in the zone without guaranteeing that any of those values are actually in the zone. A first type of change has the potential to increase that range of possible values, and a second type of change may not have the potential of increasing that range of possible values. For example, the first type of change could be an insert or update operation that has the potential to insert a value outside of the range. The second type of change could be a delete operation that, regardless of which values are affected, could not possibly increase the range of possible values. In this example, the aggregate information may be marked as stale in response to the insert operation but not in response to the delete operation.

The different types of changes may be detected by looking for certain operations in a set of command(s) or an execution plan for the command(s), or by creating a dependency on the logical set of data such that the change is detected when the change occurs. In a first example, the command(s) are analyzed to determine whether the command(s) have or trigger any insert, update, or delete operations. Command(s) that trigger insert(s) and/or update(s) may be identified as the first type of command, and command(s) that trigger delete(s) may be identified as the second type of command. In this example, the first type of command may be that which has the potential, due to the type of operation being executed, to cause the data to be outside the bounds of the aggregate information.

In a second example, the command(s) are analyzed to determine whether the value(s) or column(s) added or changed by the command could cause the data to be outside of the bounds of the aggregate information. For example, a change that adds a value that is within a range of error of a computed average for a column might not be the type of change that causes the average to become stale. As another example, a change that affects a column for which there is no aggregate data might not be the type of change that causes the aggregate information to become stale. Command(s) that add or change such value(s) or column(s) may be identified as the first type of command, and other commands may be identified as the second type of command. In this example, the first type of command may be that which has the potential, due to the value(s) being modified, to cause the data to be outside the bounds of the aggregate information.

In a third example, a data dependency is created between a database object and a zone map such that certain types of modification of the database object or even any types of modification to the database object may trigger an update to the staleness information of the zone map. The data dependency may be triggered by a system change number (SCN) mechanism that keeps track of which changes have already been performed and which changes have not yet been performed. The SCN mechanism may also keep track of when changes begin to be made and when the changes are made final (i.e., committed). The data dependency between the object and the zone map may occur sometime before the changes begin to be made or before the changes are made final. In this example, the data dependency may apply to some types of changes but not to other types of changes. Insert or update operations may trigger an update to the zone map, but delete operations might not trigger any updates to the zone map.

A first type of change may include those changes that could, if aggregate characteristic(s) of data in the zone were re-calculated, either (a) change aggregate characteristic(s) or (b) change the aggregate characteristic(s) beyond an acceptable threshold or range. The second type of change may include those changes that could not, even if the aggregate characteristic(s) were recalculated and regardless of how many such changes are made, (a) change the aggregate characteristic(s) at all or (b) change the aggregate characteristic(s) beyond the acceptable threshold or range. In other words, if the acceptable threshold is associated with the aggregate characteristic(s), then the server may tolerate, without marking zones as stale, changes that are guaranteed to keep the aggregate characteristic(s) within that threshold. Even if there is no acceptable threshold, some types of changes, such as delete operations, may, based on their function or effect, be incapable of expanding the range of possible values.

The range of possible values may be defined by a minimum and/or a maximum, as some other discrete or continuously defined range of values, or by placing a range of error tolerance around, starting from, or ending at a value for an aggregate characteristic.

For example, the aggregate information may define a range for an average value such that the actual average of values in the zone is guaranteed to be within the range but is not guaranteed to be any particular value in the range. In this example, the second type of change may be changes that insert values within the range. Because these types of changes cannot cause the average to change beyond the range, the aggregate information may remain fresh (i.e., non-stale) even if these changes are made after the aggregate information is computed. The aggregate information may be marked as stale for other types of changes. In a particular example, the range could be defined as a computed average plus or minus a threshold of 3.

As yet another example, the aggregate information may relate to particular column(s) in the zone but not to other column(s) in the zone. In this example, the second type of change may be changes that affect the other column(s) but not the particular column(s). Because these types of changes would not affect the aggregate information, the aggregate information may remain fresh even if these changes are made after the aggregate information is computed. The aggregate information may be marked as stale for other types of changes.

Marking Zones as Stale and Re-Computing Aggregate Information

Upon a change to data in a zone, the zone manager may mark the aggregate information for the zone as stale if the change is a type of change that could result in the zone having data that is no longer included within the values that could be described by the aggregate data. In other words, the aggregate information could be marked as stale in response to any change, in response to a change beyond an acceptable threshold, or in response to certain types of changes that could affect the inclusiveness or accuracy of the aggregate information.

Marking the aggregate information as stale may include updating a stored indication in the zone map. The stored indication may initially be set to "fresh" or "0" when the aggregate information is first computed, and the stored indication may be updated to "stale" or "1" upon the change that could affect the accuracy of the aggregate information. If the staleness indication is contained in the zone map, a fast refresh may be performed by accessing the zone map without having or using a separate log to store the staleness indication or the changes that were committed to the underlying data.

The aggregate information may be periodically or occasionally re-computed as a foreground or background process, optionally when resource usage is otherwise low, and optionally dependent upon whether the aggregate information is stale. The aggregate information may also be re-computed upon determining that the aggregate information is stale. The underlying data stored in the zone is accessed to re-compute the aggregate information, but the underlying data does not need to be changed or moved to refresh the aggregate information.

In one embodiment, the zone manager performs a fast refresh operation for stale zones by skipping over non-stale zones. The zone manager may check the stored indication for each zone to determine whether the zone is fresh or stale. If the zone is stale, the zone manager may re-calculate aggregate characteristic(s) of data in that zone. The process proceeds efficiently by skipping over non-stale zones without re-calculating aggregate characteristic(s) of data in the non-stale zones.

For example, the zone manager may determine which particular zones of a plurality of zones are stale. The zone manager may also determine which particular storage locations of a plurality of storage locations correspond to the particular zones. The zone manager may then access the particular storage locations to re-calculate aggregate characteristic(s) of data for the particular zones without accessing other storage locations of the plurality of storage locations that correspond to non-stale zones of the plurality of zones.

In another embodiment, the zone manager performs a full or complete refresh operation for stale and non-stale zones without skipping over non-stale zones. The full refresh may cause a change to aggregate information even if the aggregate information has not been marked as stale. For example, data in a zone may have been deleted since a last change, but the deletion might not have affected the inclusive nature of a maximum and minimum value for the column, as indicated by the aggregate information stored in a zone map.

Figure 3:
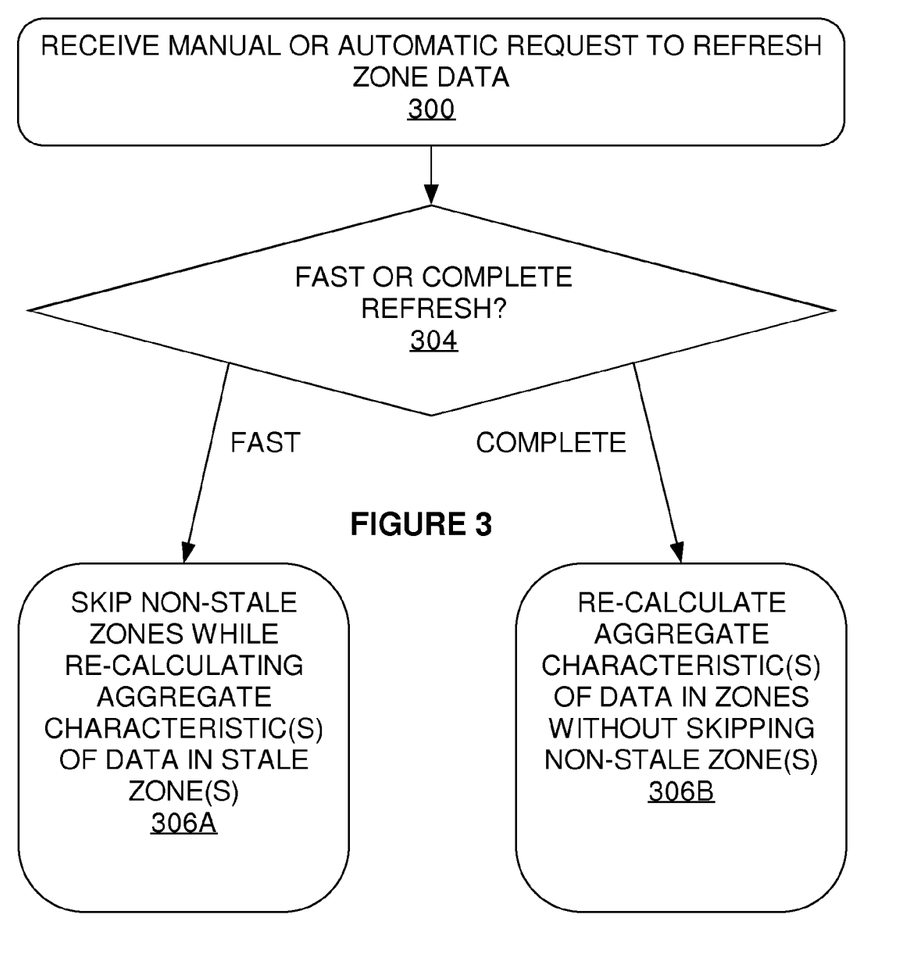
FIG. 3 illustrates an example process for refreshing zone data.

FIG. 3 illustrates an example process for refreshing zone data. As shown, in step 300, computing device(s) receive a manually generated or automatically generated request to refresh zone data. In step 304, the computing device(s) determine, based on the request, whether or not to perform a fast or complete refresh. In step 306A, upon determining to perform a fast refresh, the computing device(s) skip non-stale zones while re-calculating aggregate characteristic(s) of data in stale zone(s). Alternatively, in step 306B, upon determining to perform a complete refresh, the computing device(s) re-calculate aggregate characteristic(s) of data in zones without skipping non-stale zone(s).

In an example full or complete refresh, a maximum value of 50 may have been deleted from a column that ranged from 10 to 50. After the deletion, the new maximum value may be 45. The aggregate information may not have been marked as stale upon the deletion of the maximum value because that deletion could not have affected the inclusiveness of the maximum of 50 and minimum of 10 that were already stored in the zone map. In other words, after the deletion, all values in that column for that zone were still within the 10 to 50 range even though the column no longer included a value of 50. If used for pruning purposes, the aggregate information could still be used to accurately prune out the zone if the query is for a value outside of the 10 to 50 range.

The example illustrates how some changes may allow the aggregate information to be less inclusive of values even though they do not create any values that are outside of the range of the aggregate information. Upon re-calculating the aggregate characteristics with a full refresh, the aggregate information for a non-stale zone may be updated to be less inclusive of values, based on the actual aggregate characteristic(s) of the data at the time of re-calculation.

In one embodiment, fast refresh includes, in addition to re-computing aggregate information for the stale zones, re-computing the aggregate information for zones that are missing from the zone map. Missing zones may occur when new data is loaded or inserted into the underlying logical set of data, and this new data forms new zones.

In one embodiment, during a fast refresh of a zone map, the same zone map is queried to identify the blocks of the fact table belonging to the stale or missing zones. That is, a zone map is queried while it is being fast refreshed. In other words, a zone map not only identifies which parts of it need to be refreshed but it also identifies which portions of the fact table need to be accessed to either refresh the aggregate values for the stale zones or compute the aggregate values for the missing zones.

The following example SQL statements may be executed to refresh a zone map.

FIRST EXAMPLE REFRESH COMMAND

INSERT INTO "SH"."SALES_ZMAP"
SELECT X_ZONE_ID("SALES".ROWID),
MIN("SALES"."TIME_ID"),
MAX("SALES"."TIME_ID"),

| FIRST EXAMPLE REFRESH COMMAND |
| --- |
| MIN("SALES"."CUST_ID"),<br>MAX("SALES"."CUST_ID"),<br>0,<br>3,<br>COUNT(*)<br>FROM "SALES" "SALES"<br>WHERE<br>X_ZMAP_REFRESH('SH','SALES_ZMAP',X_ZONE_ID("SALES".ROWID) 1)=0<br>GROUP BY X_ZONE_ID("SALES".ROWID); |

The first example refresh command uses a filter predicate with X_ZMAP_REFRESH( ) function to scan only those blocks of 'sales' table that would form new zones that are currently not present in 'sales_zmap'. This example statement computes the MIN and MAX aggregates and other related information for the missing zones and inserts them into 'sales_zmap'.

The second example refresh command below uses a filter predicate with X_ZMAP_REFRESH( ) function to scan only those blocks of 'sales' table that correspond to the stale zones in the 'sales_zmap'. Note that this filter is slightly different from the corresponding filter in the first example refresh command. This second example refresh command computes fresh MIN and MAX aggregates and other related information and updates the stale zones of 'sales_zmap' making them fresh.

| SECOND EXAMPLE REFRESH COMMAND |
| --- |
| MERGE INTO "SH"."SALES_ZMAP" ZMAP$$ USING<br>( SELECT X_ZONE_ID("SALES".ROWID) "ZONE_ID$",<br>    MIN("SALES"."TIME_ID") "MIN(TIME_ID)",<br>    MAX("SALES"."TIME_ID") "MAX(TIME_ID)",<br>    MIN("SALES"."CUST_ID") "MIN(CUST_ID)",<br>    MAX("SALES"."CUST_ID") "MAX(CUST_ID)",<br>    0 "ZONE_LEVEL$",<br>    0 "ZONE_STATE$",<br>    COUNT(*) "ZONE_ROWS$"<br>FROM "SALES" "SALES"<br>WHERE<br>    X_ZMAP_REFRESH('SH','SALES_ZMAP',X_ZONE_ID("SALES".ROWID))=<br>    1<br>GROUP BY X_ZONE_ID("SALES".ROWID)<br>) ZONES$$<br>ON (ZMAP$$.ZONE_ID$ = ZONES$$.ZONE_ID$)<br>WHEN MATCHED THEN UPDATE SET ZMAP$$."MIN(TIME_ID)" =<br>    ZONES$$."MIN(TIME_ID)",<br>    ZMAP$$."MAX(TIME_ID)" = ZONES$$."MAX(TIME_ID)",<br>    ZMAP$$."MIN(CUST_ID)" = ZONES$$."MIN(CUST_ID)",<br>    ZMAP$$."MAX(CUST_ID)" = ZONES$$."MAX(CUST_ID)",<br>    ZMAP$$."ZONE_LEVEL$" = ZONES$$."ZONE_LEVEL$",<br>    ZMAP$$."ZONE_STATE$" = ZONES$$."ZONE_STATE$",<br>    ZMAP$$."ZONE_ROWS$" = ZONES$$."ZONE_ROWS$"<br>WHERE BITAND(ZMAP$$.ZONE_STATE$,2)=2<br>DELETE WHERE (ZONES$$.ZONE_ROWS$=0); |

Pruning Zones

A server may use the zone maps to prune zones during query evaluation. For example, the server may receive a query that references database object(s). Based on the query, the server may check metadata stored in the data dictionary in association with the database object(s) to determine the block addresses of the database objects and whether or not the database object(s) have been separated into zones. Alternatively, the server may determine whether or not the database object(s) have been separated into zones by looking for zone map object(s) that are associated with the database object(s). If the database object(s) have been separated into zones, the server may also retrieve the sizes of the zones from the data dictionary.

Upon determining that database object(s) have been separated into zones, the server may access the zone map(s) to determine, based on aggregate information in the zone map(s), whether different zones of the database object(s) could fall within the parameters of the received query. If at least some of the different zones cannot fall within the parameters of the received query, the server may exclude those zones from further evaluation. Such exclusion may prevent the server from retrieving and/or processing any information from the excluded zones as the query is executed. Alternatively, such exclusion may cause the server to stop retrieving and/or processing data from the excluded zones. The server may complete evaluation of the query by retrieving information from non-excluded zones, which are zones that at least could fall within the parameters of the query.

The non-excluded zones are not necessarily guaranteed to be within the parameters of the query. Rather, the excluded zones may be guaranteed not to be within the parameters of the query without any guarantees with respect to the non-excluded zones. As a result of excluding at least some zones from further evaluation, the server may save time that would have otherwise been spent retrieving data for these zones or processing the retrieved data. The server may also save time that could have been spent passing the retrieved information from memory to disk and back to memory in the case that the server does not have enough memory to store all of the retrieved data at once.

In one embodiment, a storage index is defined on a column of a base table in the storage cell memory of a storage server such as an Exadata™ machine. Unlike materialized views and zone maps, the storage index is a transient object, which is created and maintained in memory. The storage index is used to prune unqualified blocks during table scans based on the predicates on storage index column found in the user queries. A storage index divides the base table storage into fixed-size regions, such as 1 MB each, and maintains aggregate information, such as MIN and MAX aggregates of a column per region. There can be multiple storage indexes on a base table.

A storage index may be maintained using a system change number (SCN) mechanism. In the example, when a change is committed to the base table, the MIN and MAX values of the corresponding region(s) become unusable until a background zone manager process refreshes these values. In general, the aggregate values belonging to a region can be used as long as their SCN is not older than the highest SCN established for that region based on the committed changes made to the base table rows found in that region. The highest SCN per region is also maintained, separate from the storage indexes. For example, the highest SCN per region may be maintained in memory.

In one example, the server receives a user query:

```
SELECT SUM(amount_sold)
FROM sales
WHERE cust_id = 1234;
```

Assume the plan for above query uses full table scan of 'sales' table that was created by example command 1. During this table scan, the zone map is queried to determine if a particular zone of disk blocks of 'sales' table can possibly contain rows for 'cust_id' 1234 by comparing the predicate value 1234 to MIN(cust_id) and MAX(cust_id) values stored in the corresponding zone row of 'sales_z-map'. If the particular zone cannot possibly contain the rows, then all 'sales' blocks belonging to the particular zone are pruned. That is, these 'sales' blocks are not accessed.

Similar to block pruning, a zone map may also be used to prune extents from the extent map of the fact table. An extent represents a set of contiguous disk blocks, which is similar to a zone but its size can be smaller or larger than a zone. For a parallel query, the extents are used to form granules (a unit of work for parallel slave processes). Each granule is processed by a different parallel slave process. Knowing which extents will be pruned by a zone map may prevent the addition of 'empty' extents (i.e. ones all of whose blocks will be pruned away) in forming the granules. This prevents the formation of granules of unequal data sizes, and hence may avoid uneven work performed by the slave processes.

If the fact table is partitioned then a zone map may also be used to prune individual partitions of the fact table. This may be accomplished by maintaining MIN and MAX aggregate values per zone as well as per partition.

Example Single and Multiple Zone Embodiments

In one example, a logical set of data such as a database object may be defined as a single zone. The zone manager maintains aggregate information about data in that zone/database object, and the aggregate information may be marked as stale in response to a change that causes the aggregate information to no longer be useful for pruning purposes. The information may also be marked as stale if a change otherwise causes the data to be outside the range of the aggregate information.

In another example, a logical set of data is separated into multiple different zones. These zones may be non-overlapping and cover distinct sub-sets of the logical set of data. Aggregate information is maintained individually for each of the different zones, and the aggregate information may be maintained in the same zone map or in separate zone maps. The different zones may be refreshed together as part of a full refresh or separately as part of a limited refresh or fast refresh. In a limited refresh, at least a first subset of a set of zones is refreshed, and at least a second subset of the set of zones is not refreshed. Each subset may include stale and/or non-stale zones. The limited refresh may be faster than the full refresh even though it does not skip non-stale zones. However, zones in at least the second subset may remain in a stale state even after the limited refresh.

Examples of Sub-Zones and Super-Zones

In one embodiment, the zone maps define a hierarchy of zones that may include sub-zones that are children of other zones and super-zones that are parents of other zones. Aggregate information may be maintained for both a super-zone and the sub-zones that are covered by the super-zone. The staleness of any of the sub-zones may cause the super-zone to become stale but may not cause the other sub-zones to become stale. Similarly, a super-zone becomes fresh when all of the sub-zones are fresh.

A limited refresh operation may be performed on a super-zone by super-zone basis such that one or a few super-zones are refreshed at a time. Other super-zones may remain stale after the limited refresh.

In one embodiment, a super-zone is maintained for a partition, and sub-zones are maintained for data that is stored in the partition. In this embodiment, staleness of the super-zone indicates that the partition is stale. The partition may be refreshed by refreshing the super-zone that corresponds to the partition and all of the sub-zones that are included within the super-zone. A sub-zone could also correspond to a partition, in which case a super-zone would cover multiple partitions.

In one embodiment, sub-zones are set to have a same size as extents and correspond to the extents. In this embodiment, staleness of a sub-zone indicates that the extent is stale. The extent may be refreshed by refreshing the sub-zone that corresponds to the extent with or without refreshing a super-zone that includes the sub-zone or other sub-zones within the super-zone. A super-zone could also correspond to an extent, in which case the extent would include multiple zones.

Figure 4:
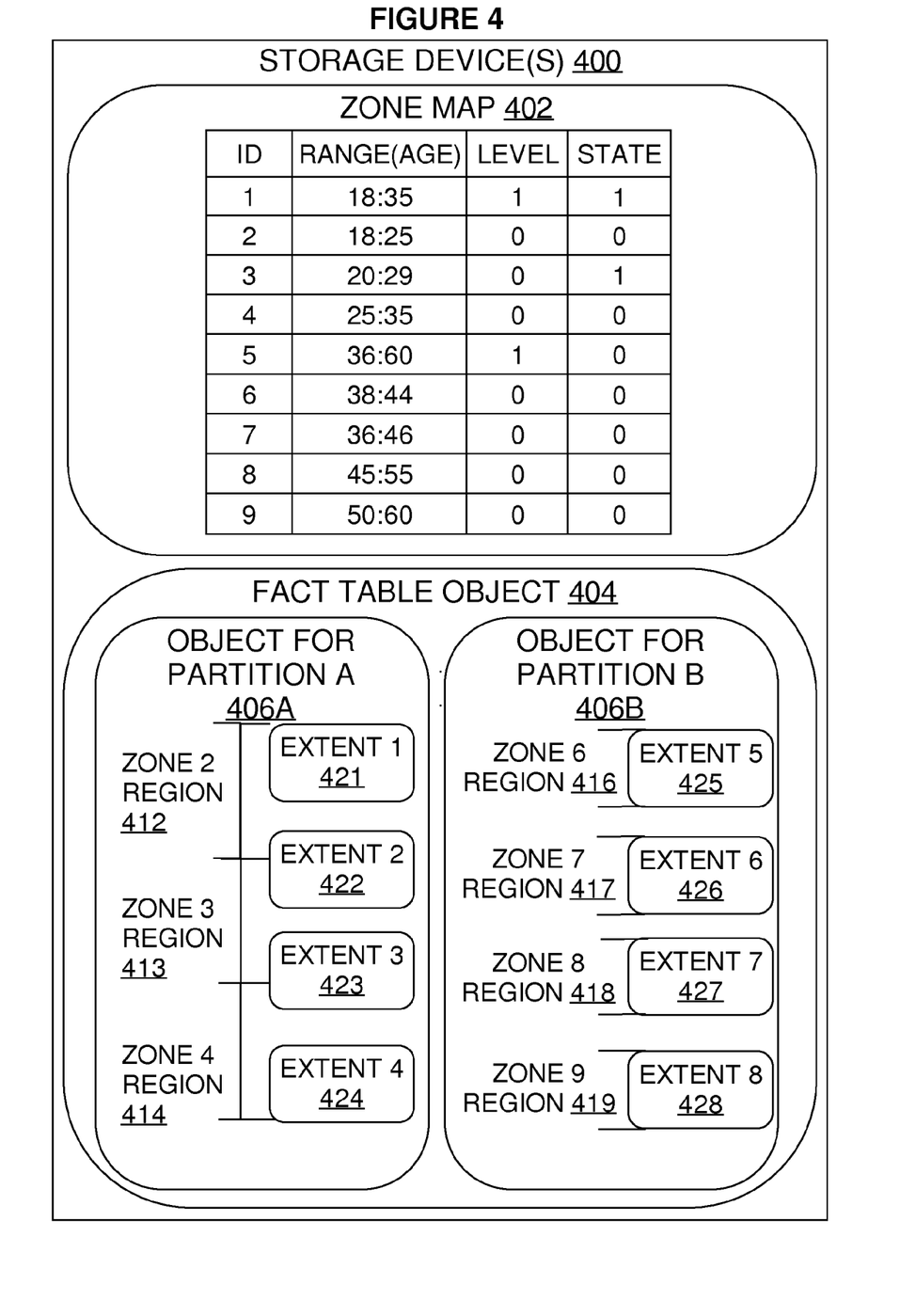
FIG. 4 illustrates an example fact table object and corresponding zone maps.

FIG. 4 illustrates an example fact table object and corresponding zone maps. In the example, partition A corresponds to zone 1, which is shown in the first row of zone map 402. Similarly, partition B corresponds with zone 5, which is shown in the fifth row of zone map 402. These rows are marked as level 1 to indicate that they are at the partition level. Also as shown, zones 2-4 have different sizes than extents and different sizes than partitions. On the other hand, zones 6-9 have the same size as extents 5-8, respectively, and correspond 1:1 with the respective extents. As shown in the zone map, zone 3, which covers data stored in parts of extents 2 and 3, is stale. Accordingly, zone 1, which includes zones 2-4, is also stale.

In the example, zone 1, which is a super-zone, may be refreshed by refreshing all stale sub-zones and skipping non-stale sub-zones. In other words, zone 1 may be refreshed by refreshing zone 3 without refreshing zones 2 or 4. Alternatively, a full limited refresh of zone 1 may be performed by refreshing zones 1-4 without refreshing zones 6-9, or a full refresh of all zones 1-9 may be performed.

Example of Defining Zones on Joined Tables

In one embodiment, zone(s) are defined on joined database objects such as tables. In this embodiment, the zone map may include information about how many anti-joined rows are in the zone or even just information about whether or not the zone includes any anti-joined rows. The aggregate information may be quickly checked to determine whether referential integrity holds for the at least one zone—if the zone includes any anti-joined rows, then referential integrity does not hold for the zone.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
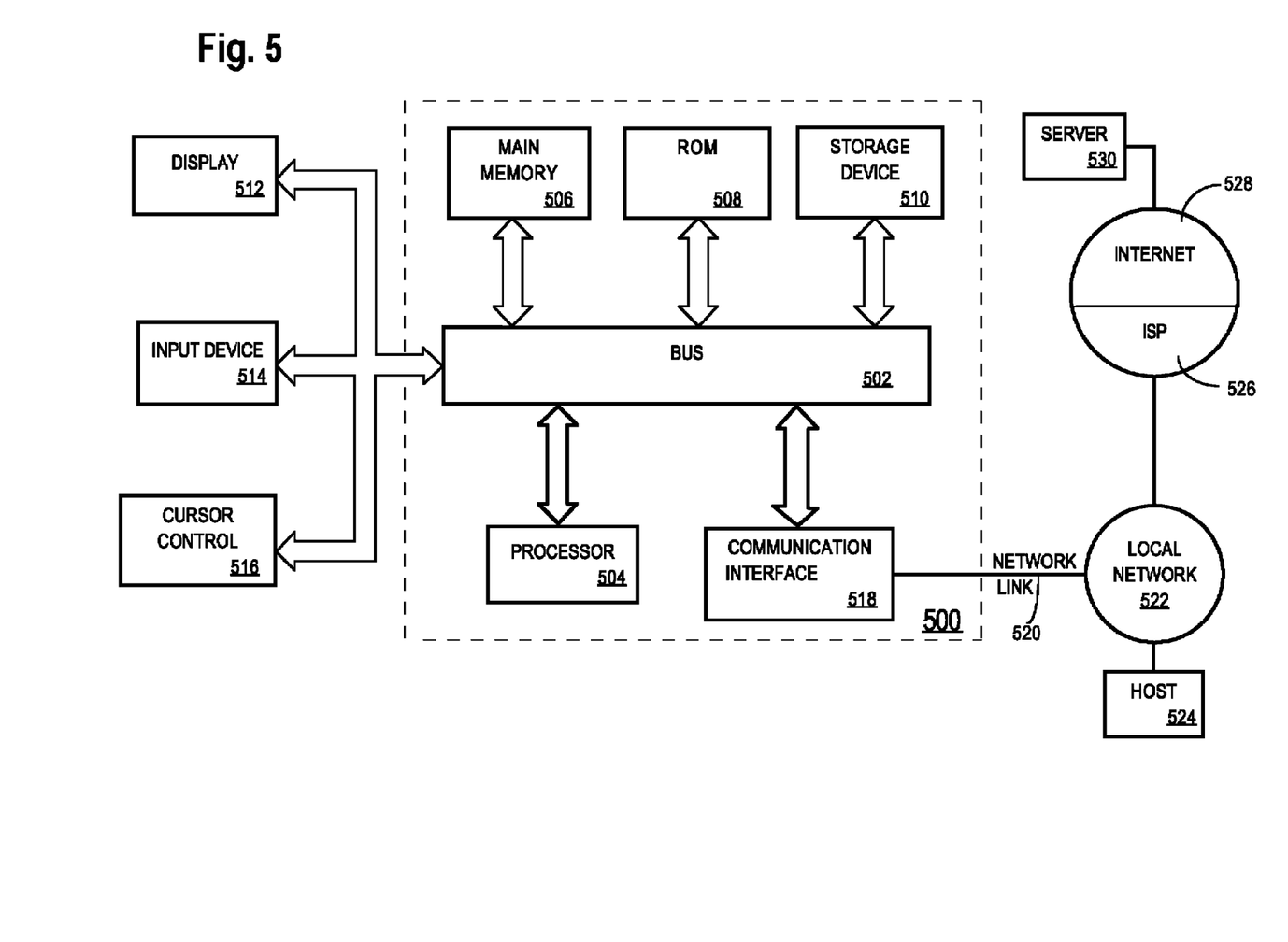
FIG. 5 illustrates an example computer system that may be combined with stored instructions to implement various techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface

518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing one or more data structures comprising: for each zone of one or more zones, said each zone corresponding to a set of contiguous blocks of a physical storage location:
   a set of one or more aggregate characteristics comprising an respective aggregate value that defines a range of possible values in a corresponding set of data stored in said each zone, and
   a stored indication that the respective aggregate value for the corresponding set of data is guaranteed to be non-stale;
   in response to an operation that causes a change to a particular zone of the one or more zones, determining whether an operation type of the operation can affect accuracy of the set of one or more aggregate characteristics for the particular zone;
   when it is determined that the operation type can affect accuracy of the set of one or more aggregate characteristics for the particular zone, updating the stored indication of the particular zone to indicate that the particular zone is stale;
   wherein when it is determined that the operation type cannot affect accuracy of the set of one or more aggregate characteristics for the particular zone, the stored indication of the particular zone indicating that the particular zone is not stale is preserved;
   receiving a query on a set of data comprising data stored in the particular zone, wherein the query comprises a predicate;
   in response to determining that the stored indication for the particular zone indicates that the particular zone is guaranteed to be non-stale, pruning the particular zone from a scan of the corresponding set of contiguous blocks of the physical storage location based on the predicate and the respective aggregate value for the particular zone; and
   retrieving data comprising query results based on said pruning;
   wherein the method is performed by one or more computing devices.

2. The method of claim 1, wherein the set of one or more aggregate characteristics for the particular zone includes at least one of:
   a guaranteed maximum value that could exist in a subset of data in the zone without guaranteeing that the guaranteed maximum value actually exists in the subset of data in the zone; and
   a guaranteed minimum value that could exist in a subset of data in the zone without guaranteeing that the guaranteed minimum value actually exists in the subset of data in the zone.

3. The method of claim 1, wherein the set of one or more aggregate characteristics for the particular zone is stored in a main memory of a storage server.

4. The method of claim 1, wherein it is determined that the operation type can affect accuracy of the set of one or more aggregate characteristics for the particular zone when the operation is an insert operation involving a specific table or an update operation involving a specific column of the specific table.

5. The method of claim 1, wherein it is determined that the operation type cannot affect accuracy of the set of one or more aggregate characteristics for the particular zone when the operation is a delete operation.

6. The method of claim 1, wherein each zone of the one or more zones is identified based at least in part on a size of the zone.

7. The method of claim 1, wherein the one or more zones are of a size that is configurable on a command interface.

8. The method of claim 1, further including receiving a data definition language command via a command interface to configure one or more zones to a particular size, said command interface evaluating commands conforming to a structured query language.

9. The method of claim 1, further comprising re-calculating sets of aggregate characteristics of data in stale zones without re-calculating sets of aggregate characteristics of data in non-stale zones.

10. The method of claim 1, further comprising:
    determining which particular zones of a plurality of zones are stale;
    determining which particular storage locations of a plurality of storage locations correspond to the particular zones; and
    accessing the particular storage locations to re-calculate sets of aggregate characteristics of data for the particular zones without accessing other storage locations of the plurality of storage locations that correspond to non-stale zones of the plurality of zones.

11. The method of claim 1, further comprising periodically recalculating sets of aggregate characteristics of data.

12. The method of claim 1, further comprising:
determining, based on the stored indication for the one or more zones, a set of excluded zones that are guaranteed to be non-stale and that are outside one or more parameters of the query,
wherein contiguous storage locations corresponding to zones in the set of excluded zones are not accessed when executing the query.

13. The method of claim 1,
wherein, for said each zone of the one or more zones, the respective set of one or more aggregate characteristics defines a range of possible values in the zone,
wherein it is determined that the operation type can affect accuracy of the set of one or more aggregate characteristics for the particular zone when the operation type can increase the range of possible values.

14. The method of claim 1,
wherein, for said each zone of the one or more zones, the set of one or more aggregate characteristics is at least one of a sum, a mean, a median, a mode, or a count,
wherein it is determined that the operation type can affect accuracy of the set of one or more aggregate characteristics of the particular zone when the operation type can change the set of one or more aggregate characteristics of the particular zone.

15. The method of claim 1, wherein the one or more zones are defined to be of a different size than one or more partitions that store data for the one or more zones, and wherein the one or more zones are defined to be of a different size than one or more extents that store data for the one or more zones, further comprising dividing up a particular partition into a plurality of zones, wherein the one or more zones comprise the plurality of zones.

16. The method of claim 1, wherein the one or more zones comprise two or more sub-zones and one or more super-zones, wherein at least one of the one or more super-zones is defined to include at least two sub-zones.

17. The method of claim 1, wherein the one or more data structures further comprise, for each zone of the one or more zones, a number of rows in the zone.

18. The method of claim 1,
wherein at least one zone of the one or more zones is defined on joined tables;
wherein the one or more data structures further comprise a number of anti-joined rows in the at least one zone;
further comprising using the number of anti-joined rows in the at least one zone to determine whether referential integrity holds for the at least one zone.

19. The method of claim 1, further comprising pruning the particular zone when the stored indication guarantees that no values in the zone can satisfy the predicate, regardless of whether the respective aggregate value is actually in the particular zone.

20. One or more non-transitory computer-readable media storing sequences of instructions, wherein the sequences of instructions, when executed by one or more hardware processors, cause:
storing one or more data structures comprising:
for each zone of one or more zones, said each zone corresponding to a set of contiguous blocks of a physical storage location:
a set of one or more aggregate characteristics comprising an respective aggregate value that defines a range of possible values in a corresponding set of data stored in said each zone, and
a stored indication that the respective aggregate value for the corresponding set of data is guaranteed to be non-stale;
in response to an operation that causes a change to a particular zone of the one or more zones, determining whether an operation type of the operation can affect accuracy of the set of one or more aggregate characteristics for the particular zone;
when it is determined that the operation type can affect accuracy of the set of one or more aggregate characteristics for the particular zone, updating the stored indication of the particular zone to indicate that the particular zone is stale;
wherein when it is determined that the operation type cannot affect accuracy of the set of one or more aggregate characteristics for the particular zone, the stored indication of the particular zone indicating that the particular zone is not stale is preserved;
receiving a query on a set of data comprising data stored in the particular zone, wherein the query comprises a predicate; and
in response to determining that the stored indication for the particular zone indicates that the particular zone is guaranteed to be non-stale, pruning the particular zone from a scan of the corresponding set of contiguous blocks of the physical storage location based on the predicate and the respective aggregate value for the particular zone;
retrieving data comprising query results based on said pruning.

21. The one or more non-transitory computer-readable media of claim 20, wherein the set of one or more aggregate characteristics includes at least one of:
a guaranteed maximum value that could exist in a subset of data in the zone without guaranteeing that the guaranteed maximum value actually exists in the subset of data in the zone; and
a guaranteed minimum value that could exist in a subset of data in the zone without guaranteeing that the guaranteed minimum value actually exists in the subset of data in the zone.

22. The one or more non-transitory computer-readable media of claim 20, wherein the set of one or more aggregate characteristics for the particular zone is stored in a main memory of a storage server.

23. The one or more non-transitory computer-readable media of claim 20, wherein it is determined that the operation type can affect accuracy of the set of one or more aggregate characteristics for the particular zone when the operation is an insert operation involving a specific table or an update operation involving a specific column of the specific table.

24. The one or more non-transitory computer-readable media of claim 20, wherein it is determined that the operation type cannot affect accuracy of the set of one or more aggregate characteristics for the particular zone when the operation is a delete operation.

25. The one or more non-transitory computer-readable media of claim 20, wherein each zone of the one or more zones is identified based at least in part on a size of the zone.

26. The one or more non-transitory computer-readable media of claim 20, wherein the one or more zones are of a size that is configurable on a command interface.

27. The one or more non-transitory computer-readable media of claim 20, wherein the sequences of instructions include instructions that when executed by said one or more hardware processors, cause receiving a data definition language command via a command interface to configure one or more zones to a particular size, said command interface evaluating commands conforming to a structured query language.

28. The one or more non-transitory computer-readable media of claim 20, wherein the sequences of instructions include instructions that when executed by one or more hardware processors, cause re-calculating sets of aggregate characteristics of data in stale zones without re-calculating sets of aggregate characteristics of data in non-stale zones.

29. The one or more non-transitory computer-readable media of claim 20, wherein the sequences of instructions include instructions that when executed by one or more hardware processors, cause:
   determining which particular zones of a plurality of zones are stale;
   determining which particular storage locations of a plurality of storage locations correspond to the particular zones; and
   accessing the particular storage locations to re-calculate sets of aggregate characteristics of data for the particular zones without accessing other storage locations of the plurality of storage locations that correspond to non-stale zones of the plurality of zones.

30. The one or more non-transitory computer-readable media of claim 20, wherein the sequences of instructions include instructions which, when executed by one or more hardware processors, cause periodically recalculating sets of aggregate characteristics of data.

31. The one or more non-transitory computer-readable media of claim 20, wherein the sequences of instructions include instructions that when executed by one or more hardware processors, cause:
   determining, based on the stored indication for the one or more zones, a set of excluded zones that are guaranteed to be non-stale and that are outside one or more parameters of the query,
   wherein contiguous storage locations corresponding to zones in the set of excluded zones are not accessed when executing the query.

32. The one or more non-transitory computer-readable media of claim 20,
   wherein, for said each zone of the one or more zones, the respective set of one or more aggregate characteristics defines a range of possible values in the zone,
   wherein it is determined that the operation type can affect accuracy of the set of one or more aggregate characteristics for the particular zone when the operation type can increase the range of possible values.

33. The one or more non-transitory computer-readable media of claim 20,
   wherein, for said each zone of the one or more zones, the set of one or more aggregate characteristics is at least one of a sum, a mean, a median, a mode, or a count,
   wherein it is determined that the operation type can affect accuracy of the set of one or more aggregate characteristics when the operation type can change the set of one or more aggregate characteristics of data.

34. The one or more non-transitory computer readable media of claim 20,
   wherein the one or more zones are defined to be of a different size than one or more partitions that store data for the one or more zones, and
   wherein the one or more zones are defined to be of a different size than one or more extents that store data for the one or more zones.

35. The one or more non-transitory computer-readable media of claim 20, wherein the one or more zones comprise two or more sub-zones and one or more super-zones, wherein at least one of the one or more super-zones is defined to include at least two sub-zones.

36. The one or more non-transitory computer-readable media of claim 20, wherein the one or more data structures further comprise, for each zone of the one or more zones, a number of rows in the zone.

37. The one or more non-transitory computer-readable media of claim 20,
   wherein at least one zone of the one or more zones is defined on joined tables;
   wherein the one or more data structures further comprise a number of anti-joined rows in the at least one zone; and
   wherein the sequences of instructions include instructions that when executed by one or more hardware processors, cause using the number of anti joined rows in the at least one zone to determine whether referential integrity holds for the at least one zone.

38. The one or more non-transitory computer-readable media of claim 20, wherein the sequences of instructions include instructions that when executed by one or more hardware processors, cause pruning the particular zone when the stored indication guarantees that no values in the zone can satisfy the predicate, regardless of whether the respective aggregate value is actually in the particular zone.

* * * * *

UNITED STATES PATENT AND TRADEMARK OFFICE
CERTIFICATE OF CORRECTION

| | | |
|---|---|---|
| PATENT NO. | : 9,659,039 B2 | Page 1 of 1 |
| APPLICATION NO. | : 14/033380 | |
| DATED | : May 23, 2017 | |
| INVENTOR(S) | : Ziauddin et al. | |

It is certified that error appears in the above-identified patent and that said Letters Patent is hereby corrected as shown below:

In the Specification

In Column 1, Line 23, delete "an" and insert -- and --, therefor.

In the Claims

In Column 24, Line 12, in Claim 34, delete "computer readable" and insert -- computer-readable --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*